United States Patent
Danieli et al.

(10) Patent No.: US 7,311,608 B1
(45) Date of Patent: Dec. 25, 2007

(54) ONLINE GAME INVITATIONS USING FRIENDS LIST

(75) Inventors: Damon V. Danieli, Clyde Hill, WA (US); Noah Heller, Kirkland, WA (US); Van C. Van, Snoqualmie, WA (US); Cameron J. A. Ferroni, Seattle, WA (US); Todd G. Roshak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 10/698,982

(22) Filed: Oct. 31, 2003

(51) Int. Cl.
*A63F 13/12* (2006.01)
(52) U.S. Cl. ....................................................... 463/42
(58) Field of Classification Search ........ 709/203–205; 345/758, 759
See application file for complete search history.

(56) References Cited

U.S. PATENT DOCUMENTS

2002/0049806 A1\* 4/2002 Gatz et al. ................. 709/203
2002/0086732 A1\* 7/2002 Kirmse et al. ............... 463/42

\* cited by examiner

*Primary Examiner*—Robert E Pezzuto
(74) *Attorney, Agent, or Firm*—Workman Nydegger

(57) ABSTRACT

A user who has signed on to an online gaming service can send an invitation to a friend appearing in the user's friends list to join in playing the game the user has loaded or may join the friend in playing the game being played by the friend, regardless of whether the game title played by the friend is the same as that loaded on the user's game console. If the game titles are different, the party needing to load the game title to be played is prompted to do so, and then prompted to reboot the game console. Information written about the new game to be played is automatically written on the hard drive of that party's game console and automatically accessed after the reboot for use in expediting the log-in process of the player who had to reboot.

21 Claims, 11 Drawing Sheets

| | | |
|---|---|---|
| 722a | | PLAYER IS NOT ON YOUR FRIENDS LIST (NO ICON DISPLAYED.) |
| 722b |  | PLAYER IS ON YOUR FRIENDS LIST. |
| 722c |  | YOU HAVE SENT THIS PLAYER A REQUEST ASKING THIS PLAYER TO BE ON YOUR FRIENDS LIST. |
| 722d |  | THIS PLAYER HAS REQUESTED TO ADD YOU TO THEIR FRIENDS LIST. |
| 722e |  | YOU HAVE SENT THIS PLAYER AN INVITATION TO PLAY A GAME. |
| 722f |  | THIS PLAYER HAS SENT YOU AN INVITATION TO PLAY A GAME. |

ONLINE GAME INVITATIONS USING FRIENDS LIST

FIELD OF THE INVENTION

This invention generally pertains to a method and system that enable a person to play an online game with a friend over a network, and more specifically, pertains to enabling a person to either invite a friend or join a friend in playing an online game, where the friend is selected from a friends list of the person.

BACKGROUND OF THE INVENTION

Participation in online electronic games is an increasingly popular pastime. Online game play permits players to interact with many more players than is typically possible when play is limited to those using the same game console. Online game players also benefit from the diverse social interaction that results from playing with a much larger pool of friends. Although playing online games with strangers can also be interesting, a player will often prefer to play with people who are actually known to the player in the "real world," or have been found by the player to be compatible during previous sessions of online game play. A player may choose to play a specific game with a friend or group of friends, and depending upon the nature of the game, the friends may compete individually against each other, or be on the same team, or may become members of competitive teams.

Microsoft Corporation's XBOX LIVE™ online gaming service enables each player who has subscribed to the service to create a "friends list" of other subscribers to the service. The friends list of a player is stored by the XBOX LIVE gaming service and is accessible by the player each time that the player signs on to the gaming service. Each player included in the friends list is identified by that player's unique Gamertag, which was selected by the player when first signing up as a new subscriber to the gaming service. When a player views the friends list after signing on to the gaming service, icons next to each Gamertag indicate whether a friend is currently online and whether a friend is using a voice communication module. If a friend's Gamertag is selected in the list, the game that the selected friend is playing is indicated, as well as the friend's progress within the game, and whether there are empty slots for any other players in the game. Selecting the Gamertag of a friend for some games also causes the display of statistics for the friend's game, such as the current score, time remaining to finish play of the current session, etc.

Typically, to enable friends to join a game the user is hosting, the user must configure the game to enable friends to play, inform the friends that a game is ready to play, wait for the friends to join the game, and then start the game. A user may pre-arrange a time to join in playing a game with friends.

Alternatively, a player who has signed on to the game playing service may want to join a friend's game. If the friend is playing a different game other than the one the user has used to sign on to the gaming service, the user will typically be required to replace the game disc in the game console with the disc for the game being played by the friend, reboot the console, log back in to the gaming service, then arrange to play in the friend's game. Conversely, if the user is playing a game other than the one a friend has used to log on to the gaming service, before accepting an invitation to play in the game currently loaded by the user, the friend must replace the game disc in the game console with the one for the game being played by the user, reboot the console, log back in to the gaming service, and arrange to play the game with the user.

Thus, there are several steps that must be carried out by a user to join in playing the game in which a friend is playing or to have a friend join in playing a game loaded by the user. Clearly, it would be preferable to facilitate inviting a friend selected by a user from the friends list of the user to join the user in playing a game so that the friend would not need to sign in to the gaming service after replacing the game disc. Similarly, the gaming service should enable a user to quickly and easily join in playing a friend's game without again signing in to the gaming service after replacing a game disc.

SUMMARY OF THE INVENTION

The present invention facilitates enabling friends to selectively engage in playing online games by making use of the friends list of each user signing on to a gaming service. By providing information about the status of other players on the friends list of a user, the user can readily make decisions about whether to invite a friend to play in a game in which the user is playing, or alternatively, to join in playing a game in which the friend is playing.

Accordingly, one aspect of the present invention is directed to a method for enabling a user to play an online game with a friend selected from a friends list of the user. The user is enabled to select a friend from the friends list of the user. Then, the user is enabled to send an invitation to the friend selected from the friends list, so that the friend is invited to join in playing the online game being played by the user, even if the friend is currently playing a different online game. Alternatively, the user may choose to join the friend in playing the online game being played by the friend, even if the friend is currently playing a different online game than the user. If the invitation was sent and was accepted by the friend, the friend is then connected with the user in playing the online game currently loaded for play by the user. Or, if the user chose to join the friend in playing, the user is connected to play the online game being played by the friend.

If the user chose to join the friend in playing the online game being played by the friend, which is different than the online game currently loaded for play by the user, the method further includes the step of causing data identifying the online game currently being played by the friend and a game session currently being played by the friend to be stored in a non-volatile storage of the user. The user is then prompted to load the online game currently being played by the friend. The online game being played by the friend (as indicated by the data stored in non-volatile storage) is compared with the online game just loaded by the user. The user is enabled to join in playing the online game being played by the friend if the online game just loaded by the user is the same as the online game currently being played by the friend, the current online game session of the friend has an opening for the user to play, and the online game session being played by the friend has not yet concluded.

If more than a predefined interval of time has elapsed since the data identifying the online game and the online game session being played by the friend were stored in the non-volatile storage of the user, the data are disregarded when the online game currently being played by the friend is loaded by the user.

If the friend accepts the invitation from the user to play in the online game currently loaded by the user, which is different than the online game currently being played by the friend, in an analogous fashion, the method further includes the steps of causing the data identifying the game being played by the user and the game session to be stored in a non-volatile storage. The friend is then prompted to load the online game currently loaded by the user. The online game currently loaded by the user, as indicated by the data stored in the non-volatile storage of the friend, is compared with the online game just loaded by the friend. The friend is connected to join in playing the online game being played by the user if the online game just loaded by the friend is the same as the online game currently loaded by the user, the online game session of the user has an opening for the friend to play, and the online game session of the user has not yet concluded.

The data stored in the non-volatile storage of the friend are disregarded when the online game currently loaded by the user is loaded by the friend, if more than a predefined interval of time has elapsed since the data were stored in the non-volatile storage of the friend.

Assuming that the online game currently loaded by the user is the same as the online game currently being played by the friend selected from the friends list, the user and the friend are immediately connected in playing the online game if the friend accepts the invitation from the user and there is still an opening for the user to play in any game session of the online game that was being played when the friend was invited to play, or the user chooses to join in playing the online game currently being played by the friend and there is still an opening for the user to play in the game session that was active when the user chose to join the play of the online game. The invitation from the user is preferably displayed on a display screen of the online game currently being played by the friend.

While not required, the user can host the online game and will then be able to determine parameters related to the play of the online game. As the host, the user is able to selectively determine whether openings for other players to play the online game will be filled only by friends included in the friends list of the user. Accordingly, the user is enabled to send a plurality of invitations to friends included in the friends list of the user, so that the selected friends are all invited to play the online game currently loaded by the user.

The host can also optionally choose to make the game session only available to players on the friends list or, more selectively, to only make the session available to friends who have been invited to join. The XBOX LIVE system enforces security and privacy on behalf of the players so that they do not have to enter a "password" to join. Friends-only game sessions are not advertised to the general public.

An online player is selectively added to the friends list of the user by sending a request to the online player. If the online player selectively accepts the request, the online player is automatically added to the friends list of the user, and the user is also automatically added to the friends list of the online player. The user is able to cancel the request for the online player to be added to the friends list of the user if the online player has not yet accepted the request.

An invitation sent to a friend on the friends list of the user to join in playing an online game is canceled after a predefined period of time has elapsed without the friend accepting the invitation.

A friend selected from the friends list of the user is enabled to bring along one or more other players who are playing in the online game currently being played by the friend. In this manner, the friend and one or more other players are joined in playing the game currently loaded by the user, depending upon the number of open slots available to be filled in the game currently loaded by the user.

The user is enabled to set a plurality of options that control an interaction between the friend selected in the friends list, and the user during play of online games. For example, a user can selectively determine whether to verbally communicate with the friend. The method also includes the step of displaying information related to online game play for each friend on the friends list.

Another aspect of the present invention is directed to a memory medium on which are stored machine readable instructions for carrying out the steps of the method discussed above. A still further aspect of the present invention is directed to a system for enabling a user to play an online game with a friend selected from a friends list of the user. The system includes a gaming service that couples players in communication to play online games over a network. A game playing device employed in the system includes a network interface for coupling the game playing device in communication with the gaming service and with other game playing devices, a memory for storing machine readable instructions, a user input control, a display interface that is adapted to couple to a display, and a processor that is connected to the network interface, the memory, the user input control, and the display interface. The processor executes the machine instructions stored in memory to carry out a plurality of functions, which are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
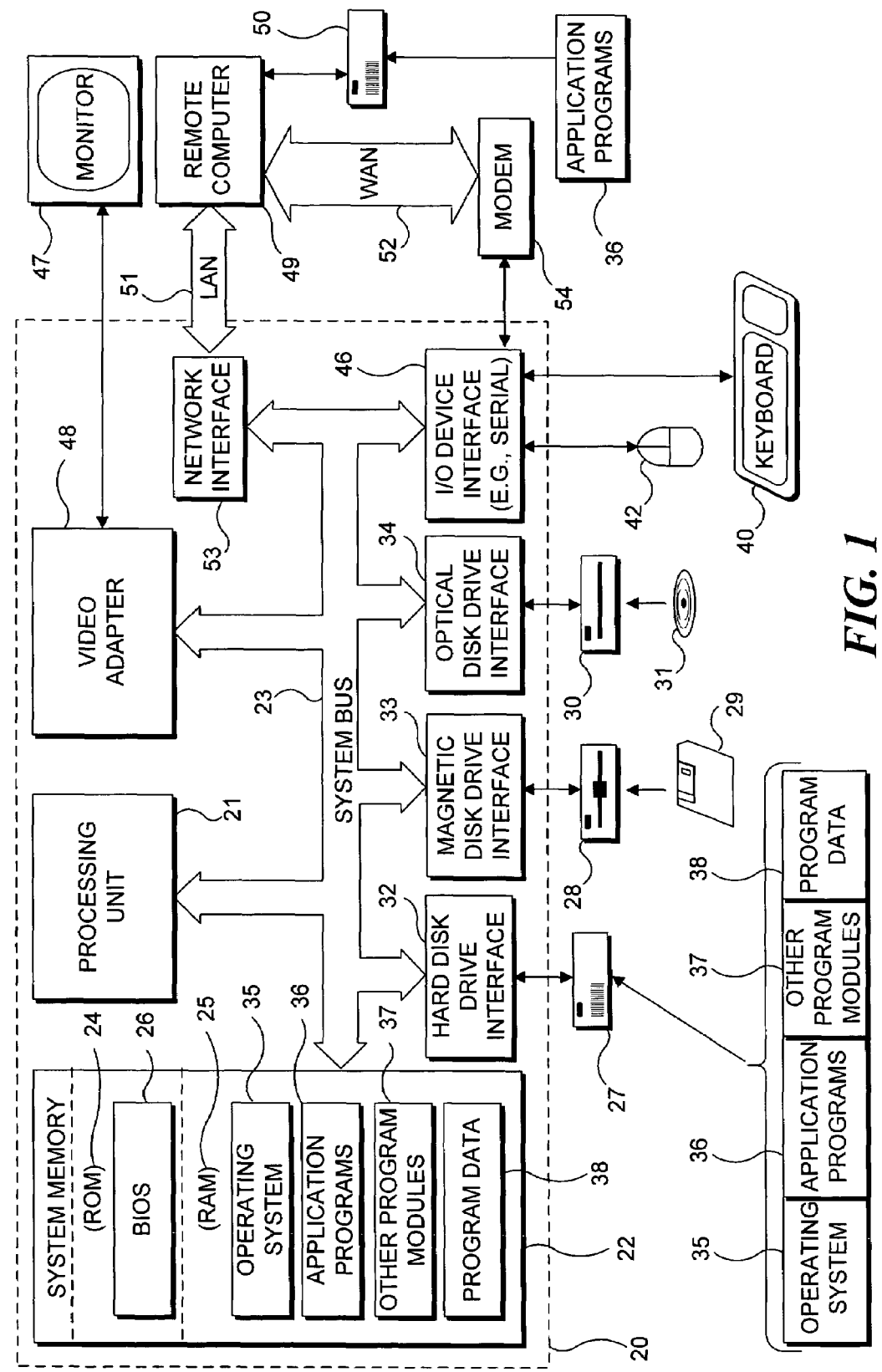
FIG. 1 is a functional block diagram of a generally conventional computing device or personal computer (PC) that is suitable for use as a server on gaming service used in practicing the present invention.

With reference to FIG. 1, an exemplary system suitable for implementing various portions of the present invention, including executing a Web browser such as Microsoft Corporation's INTERNET EXPLORER™ for accessing Web Pages over the Internet; this system is also useful for providing the functionality of a gaming service such as Microsoft Corporation's XBOX LIVE™. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in to PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. The servers employed to provide the gaming service functions will typically comprise computing devices much like that described above, but will likely access much larger hard drives or other non-volatile memory systems for storing data about subscribing users and for other elements of the gaming service.

Exemplary Game Console

Figure 2:
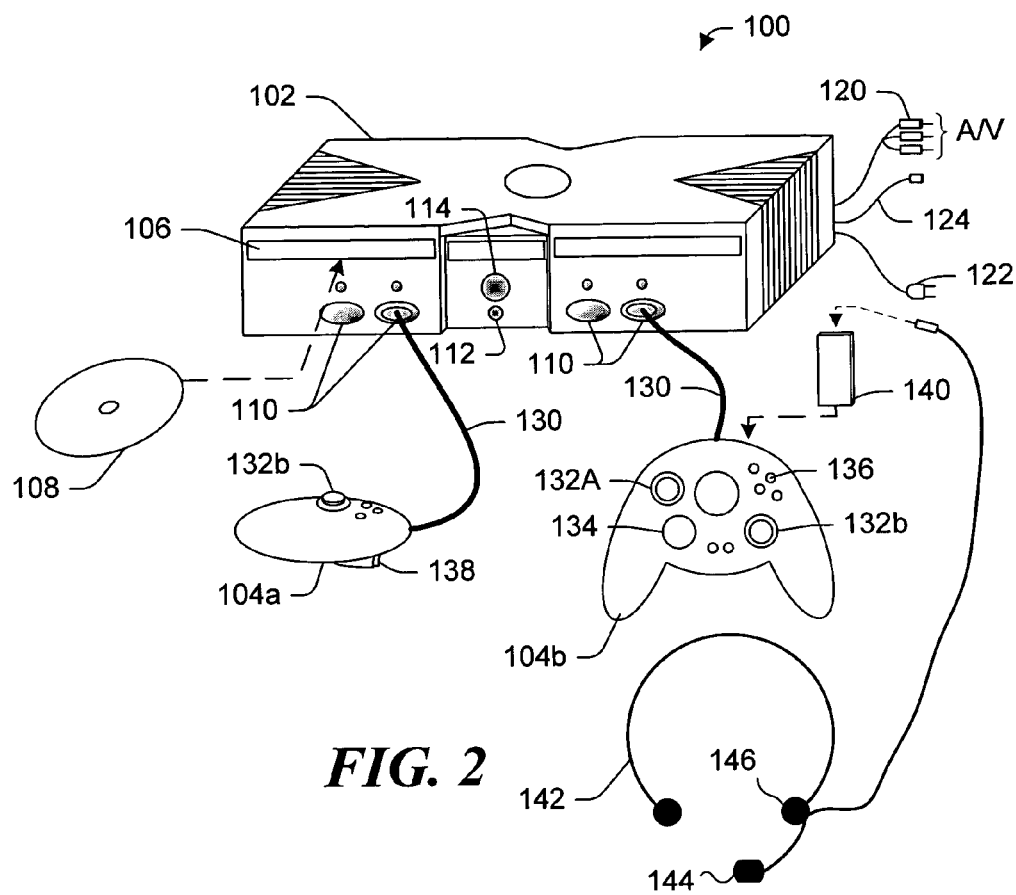
FIG. 2 is an isometric view of a game console used in playing online games by connecting to a gaming service and illustrating voice communication accessories that are often employed when playing online games that may use the present invention.

As shown in FIG. 2, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded in to memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet. Alternatively, it is contemplated that a modem (not shown) may be employed to transfer data to a network and/or the Internet. As yet a further alternative, the game console can be directly linked to another game console via an Ethernet crossover cable (not shown).

Each controller 104a and 104b is coupled to game console 102 via a lead (or in another contemplated embodiment, alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used, in addition to those shown in FIG. 2, for controlling game console 102.

Removable function units or modules can optionally be inserted in to controllers 104 to provide additional functionality. For example, a portable memory unit (not shown) enables users to store game parameters and port them for play on another game console by inserting the portable memory unit in to a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. In another embodiment that is being contemplated (not shown), the voice communicator capability is included as an integral part of a controller (not shown) that is generally like controllers 104a and 104b in other respects. The controllers illustrated in FIG. 2 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disk 108 in drive 106, from an online source, or from a function unit or module.

It must be emphasized that as supplied, game console 102 is incapable of browsing the Internet or connecting to Web addresses that display Web Pages defined by any form of hypertext markup language (HTML). Instead, it can only connect to a dedicated gaming service that has been set up to communicate with the game console over the Internet and to facilitate multiplayer games by subscribers to the service who connect through game consoles that are registered with the gaming service. Each connection over the Internet is through a VPN tunnel, so that the communications between the game console and the gaming service are secure. The game console is not currently provided with a conventional keyboard, so that entry of text messages or other text input is possible only by selecting alphanumeric characters from a display using one of the controllers. The game consoles do not have direct communication with parties outside of the environment for playing multiplayer games that is provided by the gaming service. Similarly, anyone who is not connected with a game console in the gaming environment cannot have direct communication with those who are connected to the gaming service.

Functional Components of the Game Console

Figure 3:
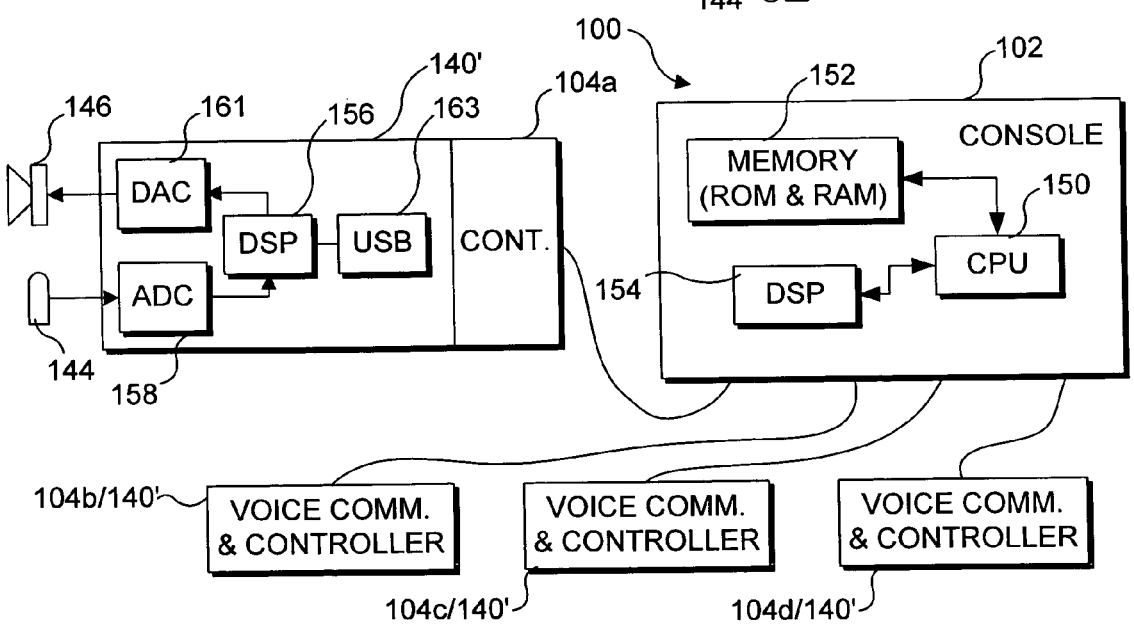
FIG. 3 is a functional block diagram of a game console and voice module like those shown in FIG. 2.

Turning now to FIG. 3, a functional block diagram illustrates, in an exemplary manner, components of the game console and components that are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a. In a current preferred embodiment, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal in to a corresponding digital signal. The digital signal from ADC 158 is input to DSP 156 for further processing, and the output of the DSP is applied to USB interface 163 for connection in to controller 104a. In this embodiment, voice communication module 140' connects in to the functional unit or module port on controller 104a through a USB connection (not separately shown). Similarly, digital sound data coming from game console 100 are conveyed through controller 104a and applied to USB interface 163, which conveys the digital signal to DSP 156 and on to DAC 161. DAC 161 converts the digital signal in to a corresponding analog signal that is used to drive headphone 146.

With reference to multiplayer game console 100, several key functional components are shown, although it should be understood that other functional components are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104*a* to CPU 150, which handles encoding of the voice stream signal for transmission to other local voice communication modules and to other game consoles over a broadband connection through an Ethernet port (not shown in FIG. 3) on the game console.

An alternative embodiment employs DSP 156 in voice communication module 140' to encode the digital signal produced by ADC 158 in response to the analog signal from microphone 144. The encoded data are then conveyed through controller 104*a* to CPU 150, which again handles transmission of the encoded data to other local voice communication modules and other game consoles over the broadband connection on the game console.

Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163. Data and verbal communications over the Internet between players participating in a multiplayer game through the gaming service are not accessible by others who are simply connected to the Internet via a PC or other type of general computing device, because these communications are conducted through the VPN tunnels that are relatively secure.

Gaming Environment

Figure 4A:
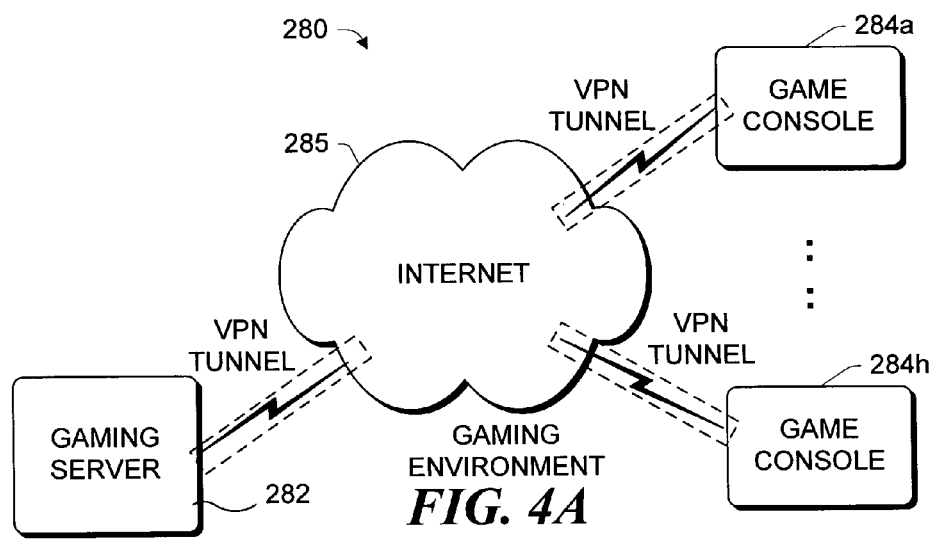
FIG. 4A is a schematic diagram illustrating how a plurality of game consoles are connected. in communication over the Internet, through a gaming service implemented by a gaming server.
Figure 4B:
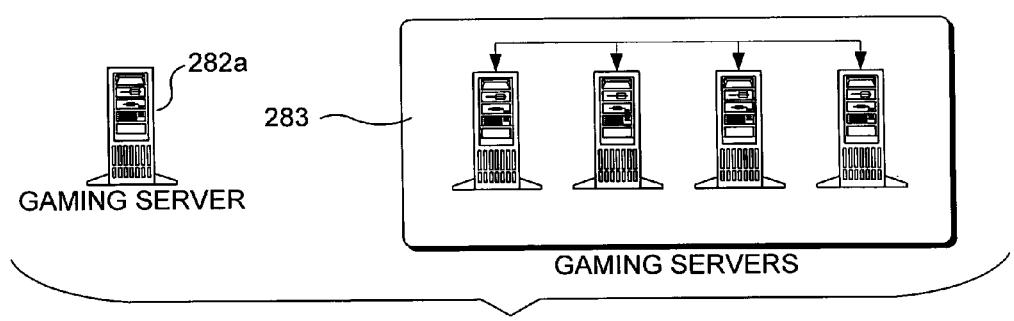
FIG. 4B is a schematic diagram illustrating a game server that is one of a plurality of game servers used for implementing the gaming service.

FIGS. 4A and 4B illustrate different aspects of the gaming environment. In FIG. 4A, a schematic diagram 280 shows that the gaming environment comprises a plurality of game consoles 284*a*-284*h*, which are connected to a gaming server 282. Data packets are conveyed between the gaming server and the game consoles through VPN tunnels, over Internet 285. Each game console 284*a*-284*h* is thus connected in secure communication with gaming server 282, which as shown in FIG. 4B may comprise a single server 282*a*, or alternatively and more likely, will include a plurality of servers 283 that are coupled together to carry out specific functions required for the gaming service. Use of the VPN tunnel insures a secure communication link between each game console and the gaming service. The secure gaming environment of FIG. 4A does not provide any option for connecting a game console over the Internet to any other device and only permits communication between game consoles that are connected to the gaming service, to enable the game consoles to participate in multiplayer games. Although a game console can conduct certain administrative functions such as subscribing, selecting passwords, and indicating other players with whom a person using the game console wants to participate in a multiplayer game, the game consoles are unable to communicate over the Internet outside the gaming environment defined by FIG. 4A. Thus, a game console of this type cannot connect with a Web page using an HTML Web browser, as is possible on a PC or other general computing device that has an Internet connection.

Communication with a Gaming Service by Friends

Figure 5:
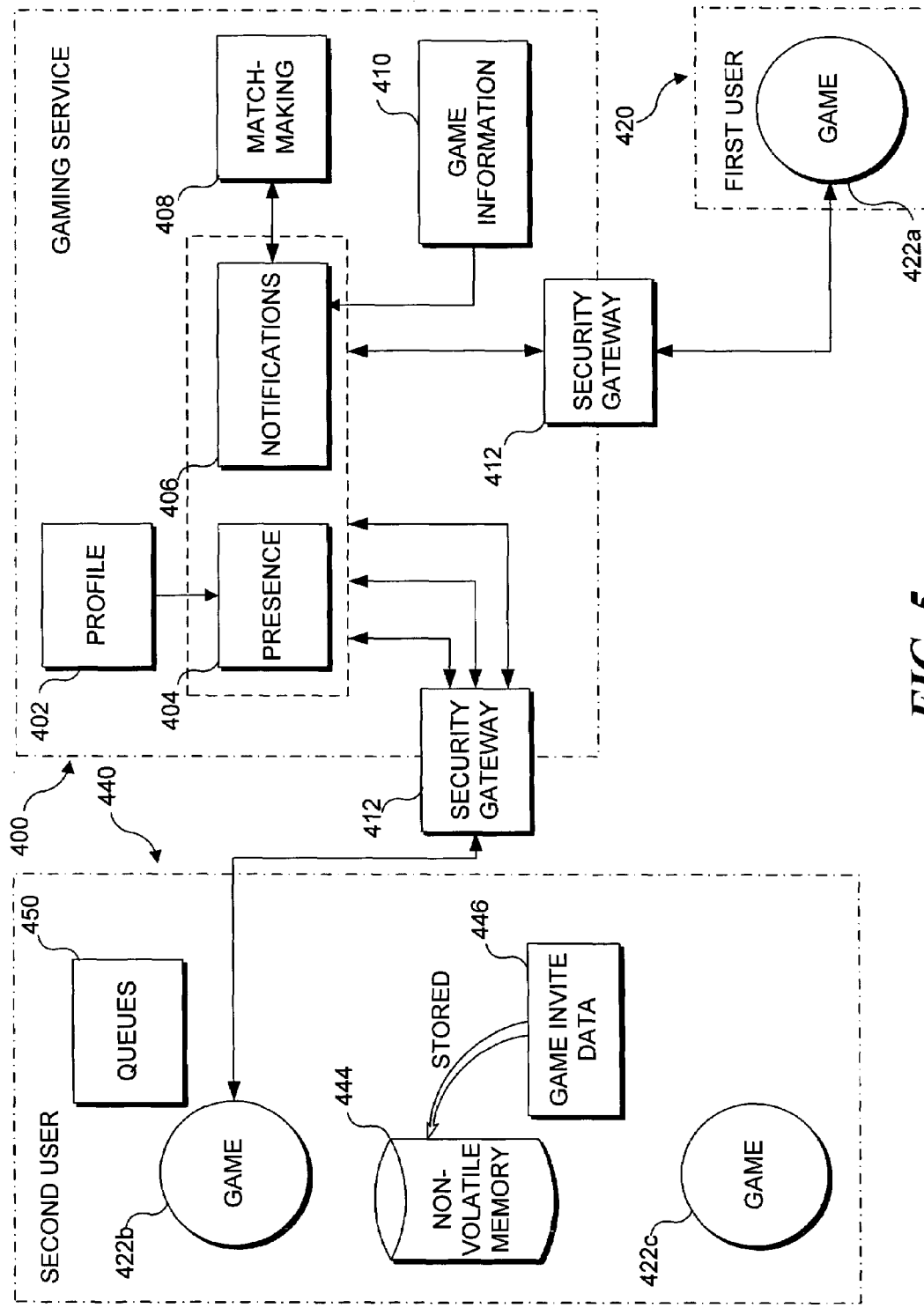
FIG. 5 is a block diagram showing two online players coupled in communication with a gaming service, indicating how one of the players can selectively join the other in playing an online game, even if they do not initially have the same online game loaded to play.

The block diagram in FIG. 5 illustrates the interaction between two online players who are included in each other's friends list and the gaming service in connection with implementing the present invention. The gaming service 400 stores a profile 402 for each user subscribing to the gaming service. This profile includes the friends list that the user has created on the gaming service. When displayed, the friends list of a user indicates unique Gamertags identifying specific online players who are subscribers to the gaming service and who have been chosen by the user to be added to the user's friends list. The friends list is important in facilitating the present invention and other aspects of online game play, as will be evident from the following explanation.

A presence service 404 running on the gaming service maintains an awareness and stores information about each of the users currently signed on to the gaming service. The presence service is thus able to provide information regarding the status of the players in a user's friends list, such as whether the person is currently online, and if so, information concerning the game that the person is currently playing, and the time already spent playing the game in a current session, etc.

A notifications module 406 is responsible for notifying a player that a user has requested the player to join in playing a game with the user and also carries out other notification functions in response to events occurring in the gaming environment. The notifications module conveys a request to a friend to join in a game being played by a user and conveys a request to and a response from the player when a user initiates adding a player to the friends list of the user.

A block 408 relates to matchmaking. This functional block is employed, for example, when a user selects an option to search for games to join based upon specific criteria such as the skill level of the players, the title of the game, and other parameters.

A block 410 indicates that the gaming service maintains game information for each game being played by subscribers connected to the gaming service. So, for example, when a user invites a friend to join in playing a game, the friend is advised about the status of that game session of the user based upon data maintained by the game information function of the gaming service. The status, which is game dependent, can indicate the progress of the game in the current session, conditions in the game environment such as the time of day and weather in the virtual game environment, and other data that may be of interest to a player deciding whether to accept an invitation to join the user in playing the game.

Any person who is signing in to gaming service 400 must sign in through a security gateway 412. Security gateway 412 implements a policy to confirm the identify of the person, with reference to the user identification for the party that was generated when the person originally subscribed to the gaming service, and also confirms the identification of the game console being used to sign on to the gaming service. Use of passwords and other user-specific input are applied by security gateway 412 to ensure that only authorized subscribers to the gaming service can sign in. Security gateway 412 can also limit the interaction of specific players, e.g., limit the right of a player to verbally communicate in games based upon any restrictions that may have been imposed on the subscriber due to prior actions and complaints about the subscriber that have been received from other players.

FIG. 5 illustrates how the present invention facilitates communication between a first user 420, who is an online player either already playing a game 422*a* or at least signed on to the gaming service with online game 422*a* loaded in the first user's game console, and second user 440 who is another online player playing a game 422*b*. Second user 440 may be the host of the game 422*b*, so that the second player has had an opportunity to select various options or parameters affecting the play of the game. For example, as the host on the current game session for game 422*b*, the second user can optionally choose to permit only friends or a selected number of players who are on the friends list of the second user to play the game. The host of an online game session can choose other options, such as the use of verbal communications, or the location of the game environment.

In this example, it will be assumed that first user 420 is in the friends list of second user 440, and therefore, the second user is in the friends list of the first user. If first user 420 invites second user 440 to join in playing a game and the gaming service validates the game session, the gaming service writes information to queues 450 to notify second user 440 that the game invitation has been received from the first user.

The simplest case for joining the two friends in playing a game occurs if both users are playing the same game title (i.e., if game 422*a* and game 422*b* are the same title). If second user 440 is interested in playing the game with the first user, second user 440 may join the game session that first user 420 is playing by simply accepting the invitation in a timely manner. The gaming service will then automatically join the second user in to the game session currently being played by the first user.

However, if second user 440 is playing a different game (i.e., if games 422*a* and 422*b* are different game titles), it will be necessary for the second user to boot the game console with the same game title currently being used by the first user—and in a timely fashion. If second user 440 is interested in playing the game currently being played by the first user and accepts the invitation, the software comprising game 422*b* is required to store game invite data 446 for game 422*a* in non-volatile memory 444 of second user 440's game console. In the current preferred embodiment, game invite data 446 are stored in a predefined location on the hard drive in the game console of second user 440. Second user 440 is then instructed by the software comprising game 422*b* to insert a game 422*c*, which is on a new disc and has the same game title as game 422*a*, which was loaded by first user 420, and then is directed to reboot the game console. During the rebooting process, game 422*c* instructs the game console to check the predefined non-volatile memory location to determine if there is any game invite data 446 that specifies the game title identification (ID) for game 422*c*. Since the game invite data 446 indeed includes the game title ID for game 422*c* (which is the same as that of game 422*a*), game 422*c* will automatically bypass parts of the log in process to expedite logging the second user on to the gaming service. Specifically, the second user will not be required to go through the authentication and authorization process, but instead, the gaming service will presume that the second user has simply rebooted the game console with the new game loaded and need not be authenticated. The friends are thus expediently joined in playing a session of the same game title.

The game invite data are only used if the correct game 422*c* is loaded and the boot up with the correct game occurs within a predefined time interval, which is about eight minutes in a preferred embodiment. Game invite data 446 contains a time stamp indicating when the game invite data were written to the non-volatile memory. If the user delays too long in loading game 422*c* so that the boot up of the game console with game 422*c* loaded occurs after the predefined time interval has elapsed, the game console will disregard the existence of the game invite data on the non-volatile memory for game 422*c*, and will therefore not carry out an expedited log in process for the second user. This approach is used to prevent second user 440 from joining a game session with the first user that has probably already expired and minimizes the risk that a different party who has not been invited to play with the first user, but started using the game console after the second user accepted the invitation from the first user might be improperly joined in a game session with the first user. It is contemplated that in the alternative, a different predefined time interval might be used, or that the game invite data might not be caused to expire.

It must be emphasized that in this embodiment, the designers of all of the games licensed to sell games that run on the game console have agreed to respond to an accepted game invitation by writing the game invite data for the invitation to the hard drive of the user's game console, to identify a different game being played by the user issuing the invitation. Also, each game designer has agreed to initially check the predefined location on the hard drive of the game console during the boot up process to determine if the game invite data refer to the game currently being booted up, and if so, to use the (unexpired) game invite data to cause the gaming service to expedite the process so that the second user is not required to sign on to the gaming service before being joined in playing the game session with the first user. Clearly, if the user loads the wrong game before booting up, the game invite data will not include the game ID for the game being booted and will not be used for expediting the first user signing on to the gaming service. Also, if the gaming service determines that the game invite data were for a game session that has already expired, the second user will not be joined in playing the game currently being played by the first user.

Instead of inviting the second user to join in playing the game session currently being played by the first user, the first user may instead choose to join in playing the game session currently being played by the second user. In this case, the first user effectively invites himself/herself to play in the game session of the second user. The self invitation is handled in the same way as an invitation issued by the first user to the second user, except that the "invited party" is now the first user, so there is no need for the invitation to be accepted. Thus, if first user 420 decides to join second user 440 in playing game 422*b*, and if game 422*a* is the same game title as game 422*b*, the first user will select the second user from the friends list of the first user and then select an option to join second user 440 in playing the current session of game 422*b*. Assuming that there is an open slot for the first user in the game session of game 422*b*, the gaming service will validate the joining of first user 420 in the current game session of game 422*b*. However, if game 422*a* is different than game 422*b*, the first user will be advised to replace the current game disc with one for game 422*b* and then reboot the game console. Again, game invite data will be written by game 422*a* on the non-volatile memory, or the hard drive of the first user's game console, with the game ID for game 422*b* and the indication of the game session being played by second user 440.

After first user 420 has rebooted with the same game as game 422*b*, the game software will check the predefined storage location on the hard drive in the first user's game console for the game invite data. If the time stamp has not expired as a result of the predefined time interval having tolled, and if the indicated game session is still active, the sign in of the first user to the gaming service will be expedited, and the first user will be automatically joined in the game session of game 422b, which is being played by second user 440. Again, a delay in rebooting the game console with the correct game loaded in excess of the predetermined time interval will cause the game invite data to be ignored and the sign in of the first user to the gaming service will then not be expedited.

It will be apparent that employing the friends list to enable a user to select a friend to either invite to play in a game session with the user, or alternatively, to join in playing a game session greatly facilitates the ease with which friends can be efficiently joined in playing a game. Clearly, the ability to select a friend to play a game from a friends list of online players known to be compatible with a user in skill and demeanor adds enjoyment to the experience.

Handling Friend Requests

Figure 6:
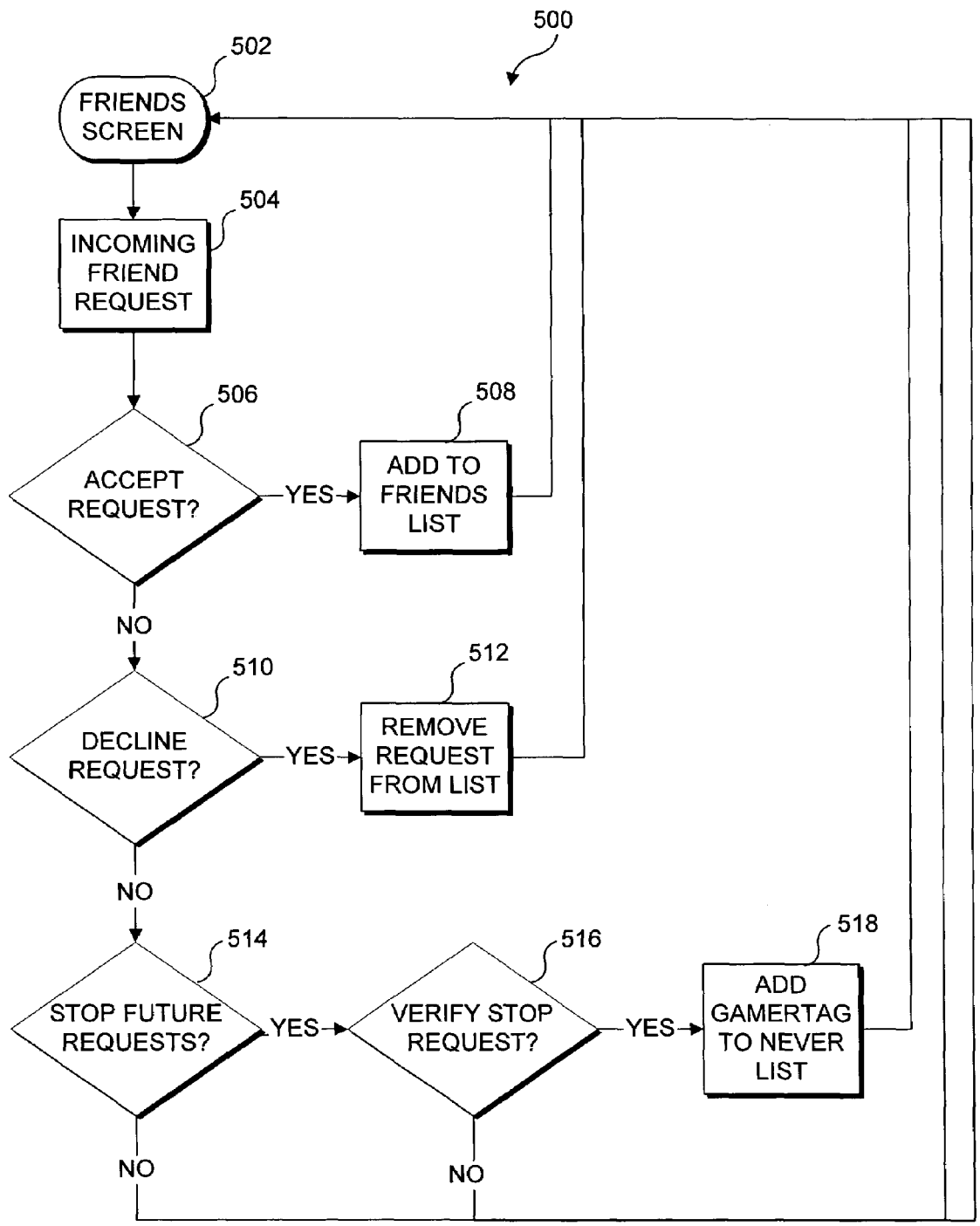
FIG. 6 is a flow chart showing the process for handling an incoming friend request.

FIG. 6 illustrates, in an exemplary manner, the handling of a friend request received by an online player. As indicated in a flow chart 500, a step 502 displays a friend's user interface screen. When a user wants to add a player participating in an online game with a user to the user's friends list, the user selects the player's gamer tag and an option to request that the selected player be added to the friends list of the user. In response, gaming service notifications module 406 generates a friend request 504 and writes the request to queues 450, thereby notifying the player of the request by the other user and displaying the friend's user interface in step 502. If the player receiving incoming friend request 504 responds to the notification, the player is presented with an accept request 506 decision step, a decline request 510 decision step, and a stop future requests 514 decision step. Accepting the request initiates a step 508 that puts the requesting user's Gamertag on the receiving player's friends list (and vice versa) and returns the player to friends screen 502. If the player receiving the request declines the request, the request is removed from the list in a step 512 and the player is returned to the friend's user interface screen in step 502.

The player receiving the request can optionally stop future requests being received from the user in a decision step 514. If the player selects this option, a decision step 516 verifies the stop request. Verifying that all future requests from the user should be stopped causes the Gamertag of the user to be added to a list of users from whom the player never wants to receive such requests in a step 518, thereby blocking subsequent friend requests from that user. The player is then returned to the friend's user interface screen in step 502. Not stopping future requests or not verifying that future requests should be stopped also returns the player receiving an incoming friend request 504 to the friend's user interface screen in step 502.

Figure 7:
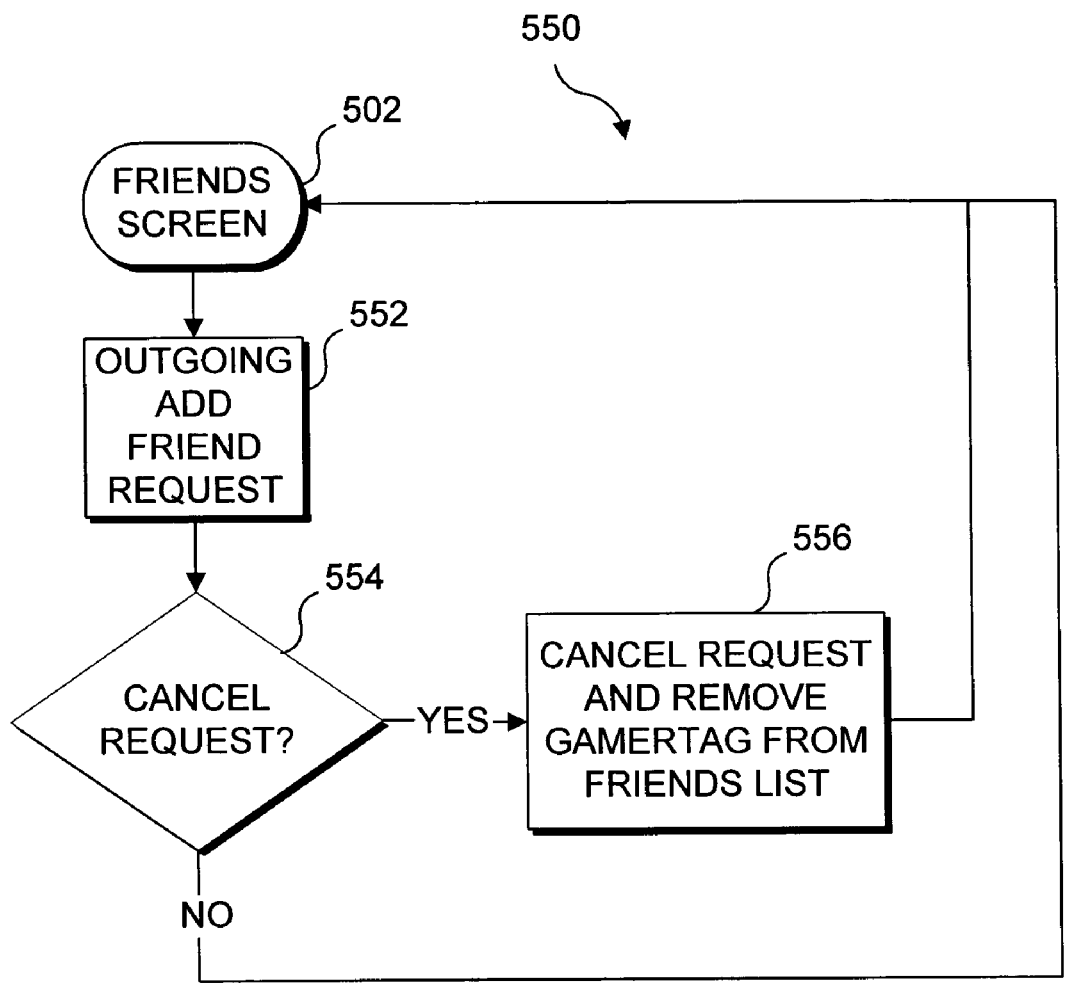
FIG. 7 is a flow chart showing the process for handling an outgoing friend request.

FIG. 7 illustrates the steps relating to a user sending an "add friend request" to a player. As shown in a flow chart 550, step 502 displays the friend's user interface screen to the user who wants to add a player to the user's friends list. The gaming service notifications module 406 generates an outgoing friend request 552 to notify the receiving player of the request. The user who initiated the friend request is presented with a cancel request option in a decision step 554. If the user selects this option before the player receiving the request responds, a cancel request is initiated in a step 556, and the Gamertag of the player sent the request is removed from friends list of the user. The logic then returns the user to the friend's user interface screen at step 502, as does a decision not to cancel the request. Assuming that both the user and the player requested agree, each is added to the friends list of the other.

Handling Game Invites

Figure 8:
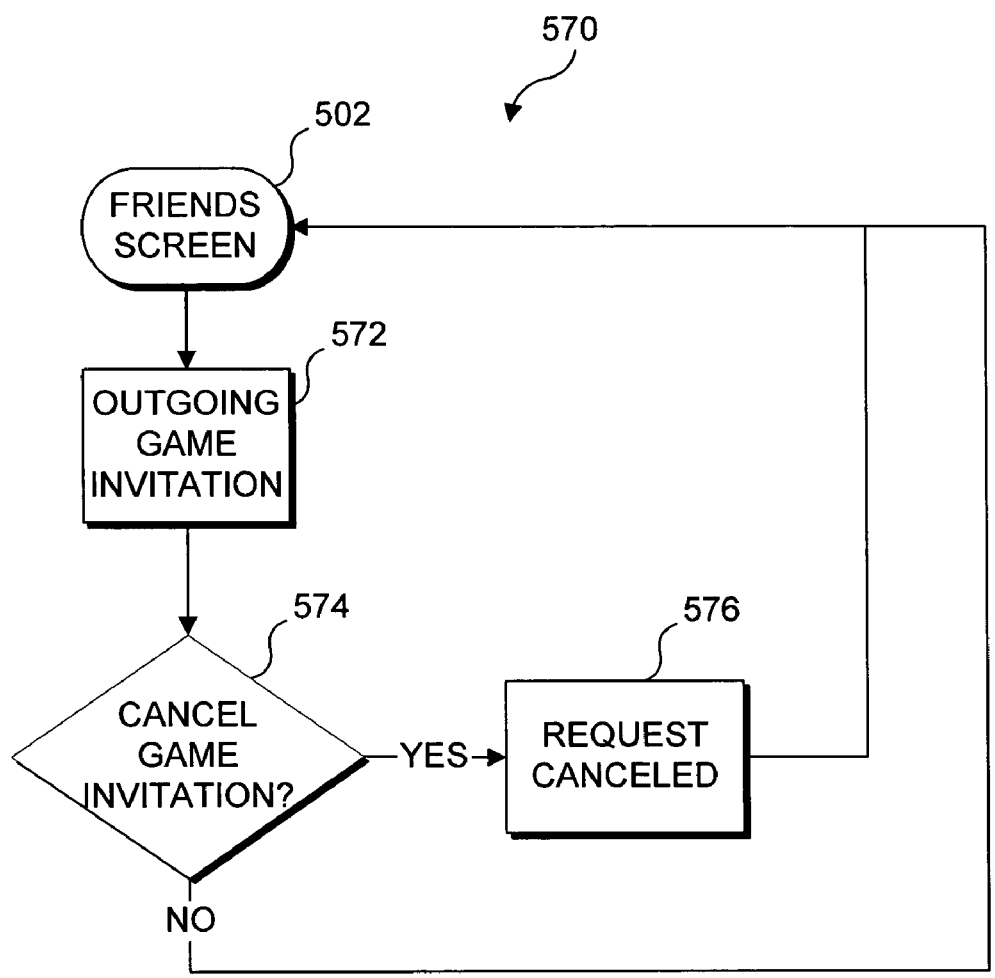
FIG. 8 is a flow chart showing the process for handling an outgoing game invite.

FIG. 8 illustrates the logic for handling an invitation to join in playing a game that is sent to a friend by a user. A flow chart 570 indicates that the friend's user interface screen is displayed in step 502. The friend's user interface screen indicates the status of any friends in the list who are currently online when the friend's Gamertag is highlighted, identifying the game title that the friend is currently playing, how long that friend has been playing that game, and other game specific information. When a user selects one of the friends in the list and selects an option to request the friend to join the user in playing the game that the user currently has loaded on the game console of the user, gaming service notifications module 406 generates an outgoing game invitation in a step 572 to notify the selected friend and player of the invitation. The user who initiated the game invitation is presented with a decision step 574 in which the user can determine whether to cancel the game invitation, which can be done anytime before the player sent the invitation has responded. Canceling the invitation before the selected player acts on it initiates a step 576 that removes the notification to the receiving player and returns the player who sent the invitation to the friend's user interface screen in step 502. A decision not to cancel the invitation also leads the user back to the friend's user interface screen at step 502 until the friends are joined in playing the game.

Figure 9:
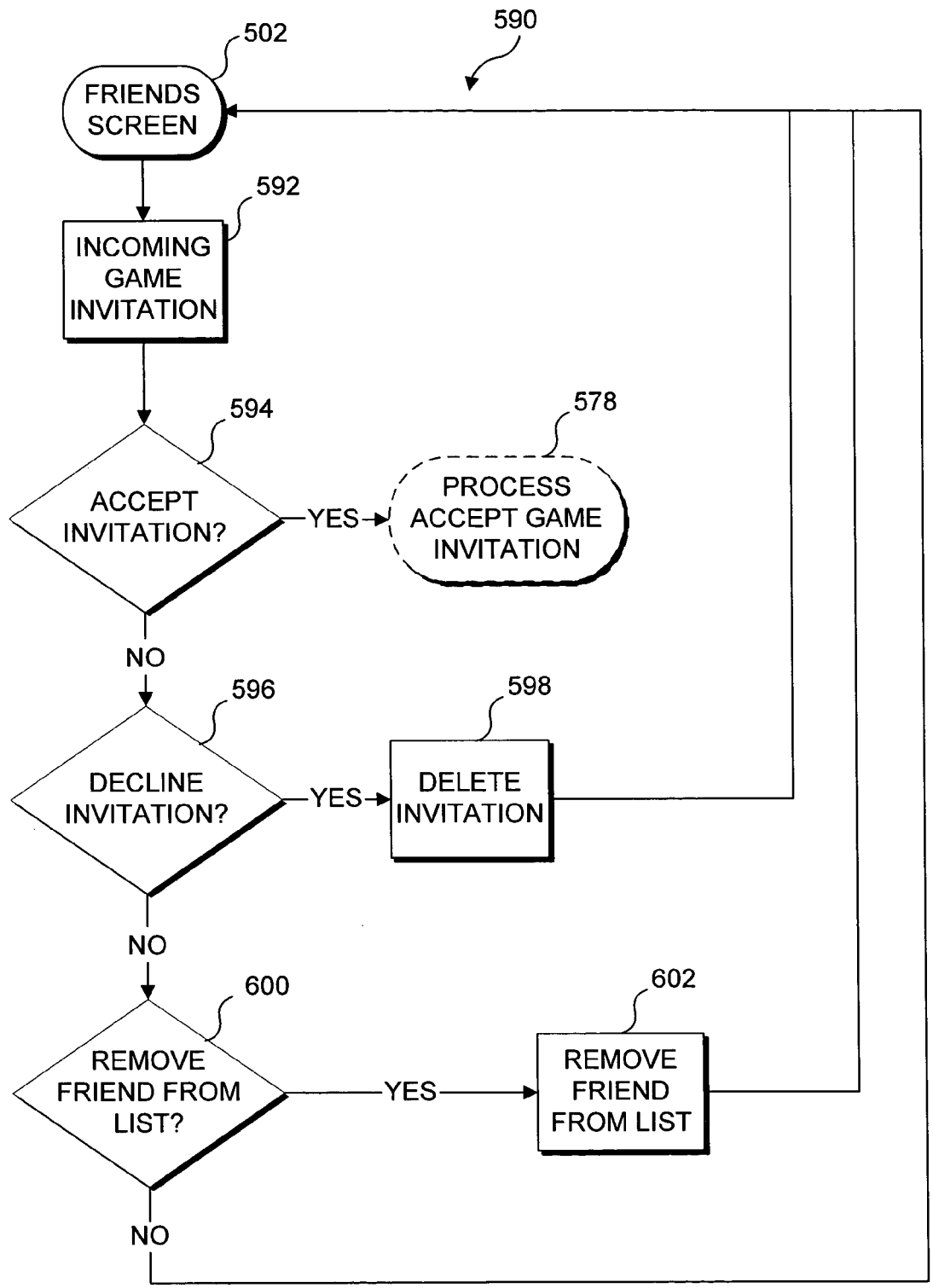
FIG. 9 is a flow chart showing the process for handling an incoming game invite.

FIG. 9 illustrates a flow chart 590 showing the steps that are carried out when a player receives a game invitation from a user who is on the player's friends list. Step 502 displays the friend's user interface screen to the player. Gaming service notifications module 406 generates the incoming game invite received from the user in a step 592, and writes the invitation to queues 450 to notify the player that the invitation has been received. A game designer can provide an icon, a dialog box, or other form of notification to alert the player that a request has been received from a friend to join in playing a game. The form of notification is chosen so that when a player receiving an invitation is actively involved in playing a game, the invitation will cause minimal disruption of game play. A decision step 594 determines if the player receiving the incoming game invitation has chosen to accept. If so, a step 572 processes the acceptance of the game invitation, details of which have been discussed above in connection with FIG. 5. If the player does not accept the invitation, a decision step 596 determines if the player has specifically declined the invitation to join the user in playing the game, which leads to a step 598 in which the invitation notification is deleted. The player receiving the invitation may also decide, in a decision step 600, to remove the user (i.e., the Gamertag for the user) who sent the invitation, from the player's friends list. Removing the user from the list is accomplished in a step 602. If the player decides to remove the user from the player's friends list, the player will also automatically be removed from the user's friends list. After steps 598, 602, or if the player does not want to remove the user from the player's friends list, the friend's user interface screen is displayed to the player in step 502.

Screen Displays

Figure 10:
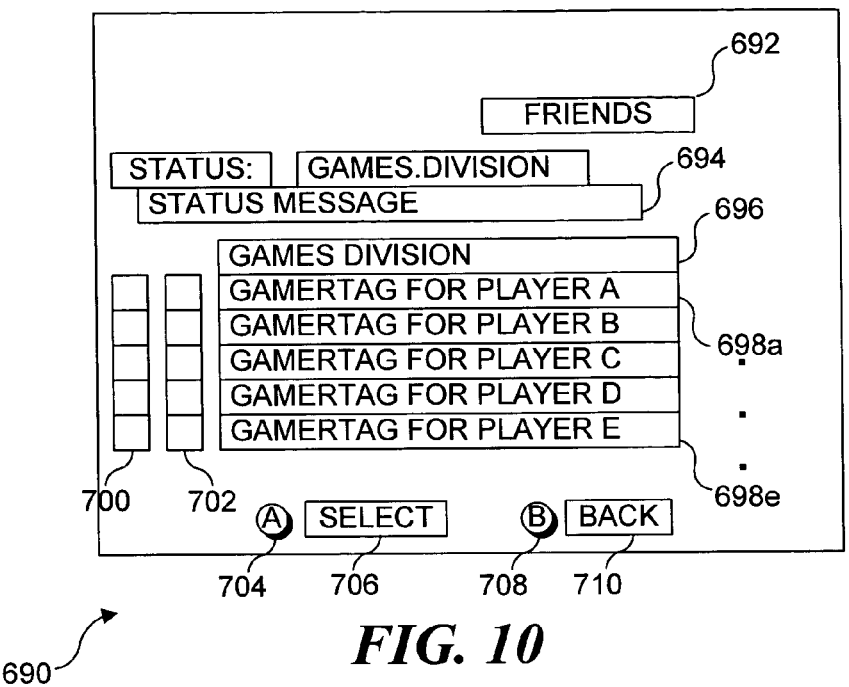
FIG. 10 is an illustration of a screen display of the friends list.

FIG. 10 illustrates an exemplary friend's user interface screen 690, which includes a screen title 692. Also included in the friend's user interface screen is a status message 694 that displays information about a currently selected friend in the friends list, and an indication of the games division 696. Gamertags 698a-698e in user interface screen 690 uniquely indicates the friends in the friends list. Communicator icons 700 for each of the friends indicate the status of the friend's voice peripheral, while presence icons 702 for each of the friends indicate the online/offline status of the friend. Also included are an icon 704 for the "A" button on the handheld controller and its select function 706 on the current friend's user interface screen, and an icon 708 for the "B" button on the handheld controller and its back function 710 on the current friend's user interface screen.

Figure 11A:
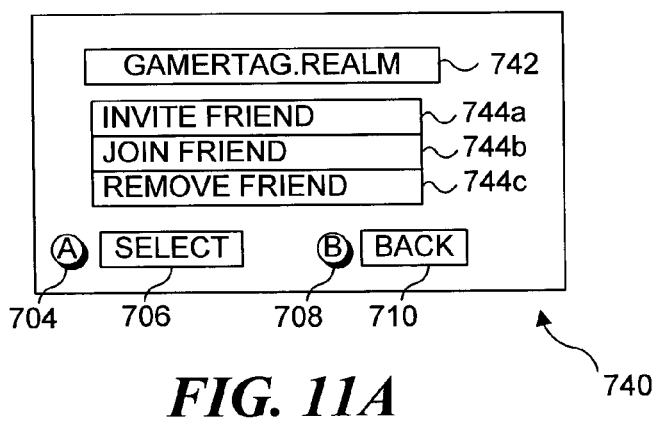
FIG. 11A is an illustration of a screen display showing the options available to a user for sending a game invitation.

FIG. 11A illustrates an exemplary screen 740, which is displayed to a user sending an invitation to a friend selected from the user's friends list to play an online game. Screen 740 includes a Gamertag.realm title 742 and displays options 744a-744c from which the user can select to carry out an option in regard to the friend that was selected in the friends list of the user. Thus, by selecting option 744a, the user can initiate sending an invitation to the friend who was selected to join the user in playing the game currently loaded on the user's game console. Of particular note is "join friend" option 744b, which when selected, enables a player to effectively invite himself to join in playing a friend's game. "Remove friend" option 744c is provided to enable the user to remove the selected friend from the friends list of the user, which will also remove the user from the friends list of the player who was selected by the user before screen 740 was displayed. Also included on screen 740 are an icon 704 for the "A" button on the handheld controller and an explanation of its "select" function 706, and an icon 708 for the "B" button on the handheld controller and an explanation its "back" function 710.

Figure 11B:
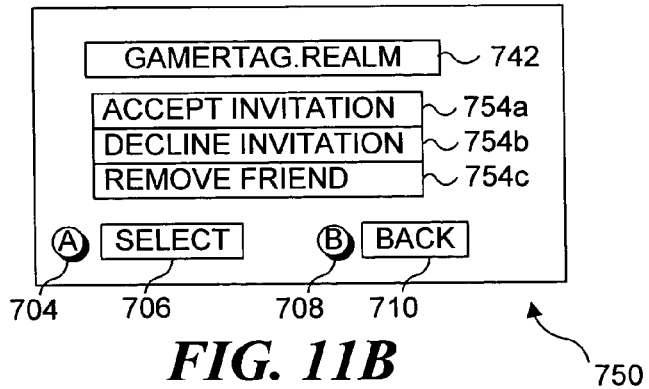
FIG. 11B is an illustration of a screen display showing the options available to a user who has received a game invitation.

FIG. 11B illustrates an exemplary screen 750 that is displayed to a player receiving an invitation to join a friend in playing a game. Screen 750 includes a title 742 and displays options 754a-754c from which the player can select in response to receiving the invitation. By selecting "accept invitation" option 754a, the player will be enabled to join the user in playing the game session (if any) currently running on the user's game console. Conversely, selecting "decline invitation" option 754b causes a notification to be sent to the user that the player selected on the friends list of the user has decided not to join the user in playing the game currently loaded by the user. By selecting "remove friend" option 754c, the player may decide to remove the user from the friends list of the player, which will also cause the player to be removed from the friends list of the user. Also included are an icon 704 for the "A" button on the handheld controller and an explanation of its function 706 on screen 750, and an icon 708 for the "B" button on the handheld controller and an explanation of its function 710.

Depending on an action selected by the player, an appropriate screen that lists available options will be displayed. For example, although not shown, during play of a game, an appropriate screen will be displayed for sending an add friend request to a player whose Gamertag has been selected by the user from a list of players, for responding to an add friend request, or to implement other available functions.

Presence Icons

Figure 12:
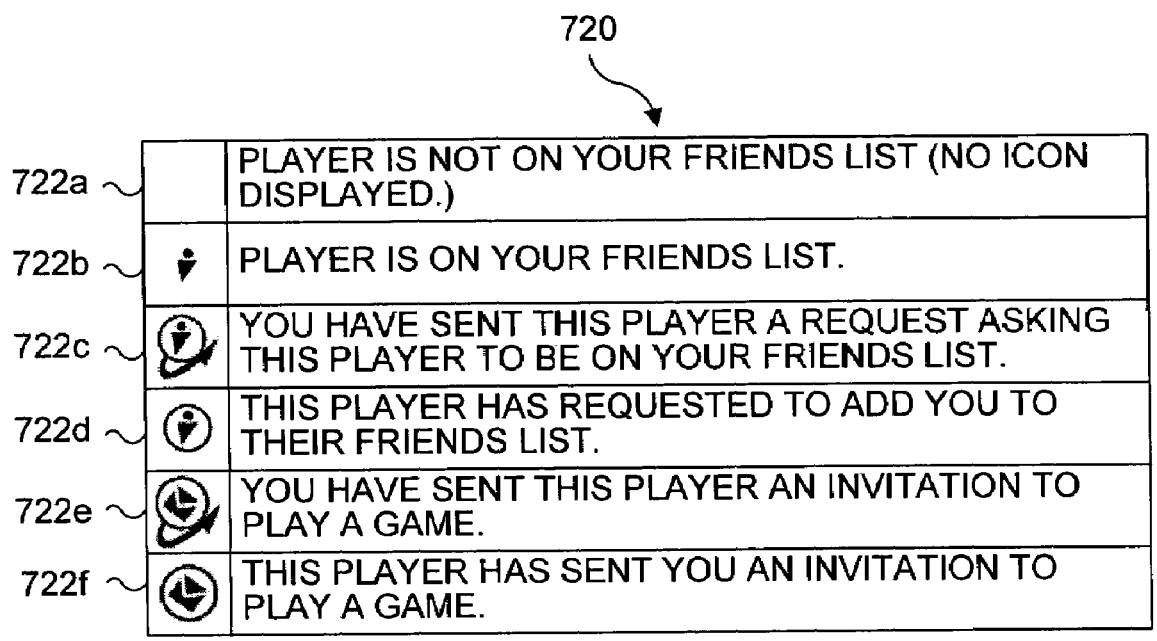
FIG. 12 is a table showing the presence icons and their meanings that appear on the friends list.
Figure 12:
Figure 12:
Figure 12:
Figure 12:

FIG. 12 illustrates an exemplary table 720 showing the presence icons and their meanings. A line 722a indicates that if a presence icon is not included, the player is currently in the session (on the players list) but not on the user's friends list. A line 722b illustrates an icon indicating a player is in the game session (on the players list) and additionally on the user's friends list. A line 722c illustrates an icon indicating the user has sent this player a request to add this player to the user's friends list. A line 722d illustrates an icon indicating this player has requested to add the user to the player's friends list. A line 722e illustrates an icon indicating the user has invited the player to join in playing a game. A line 722f illustrates an icon indicating the player has sent the user an invitation to play a game. These presence icons 702 are displayed on the friend's user interface screen, as noted above in regard to FIG. 10.

Handling Notifications

Figure 13:
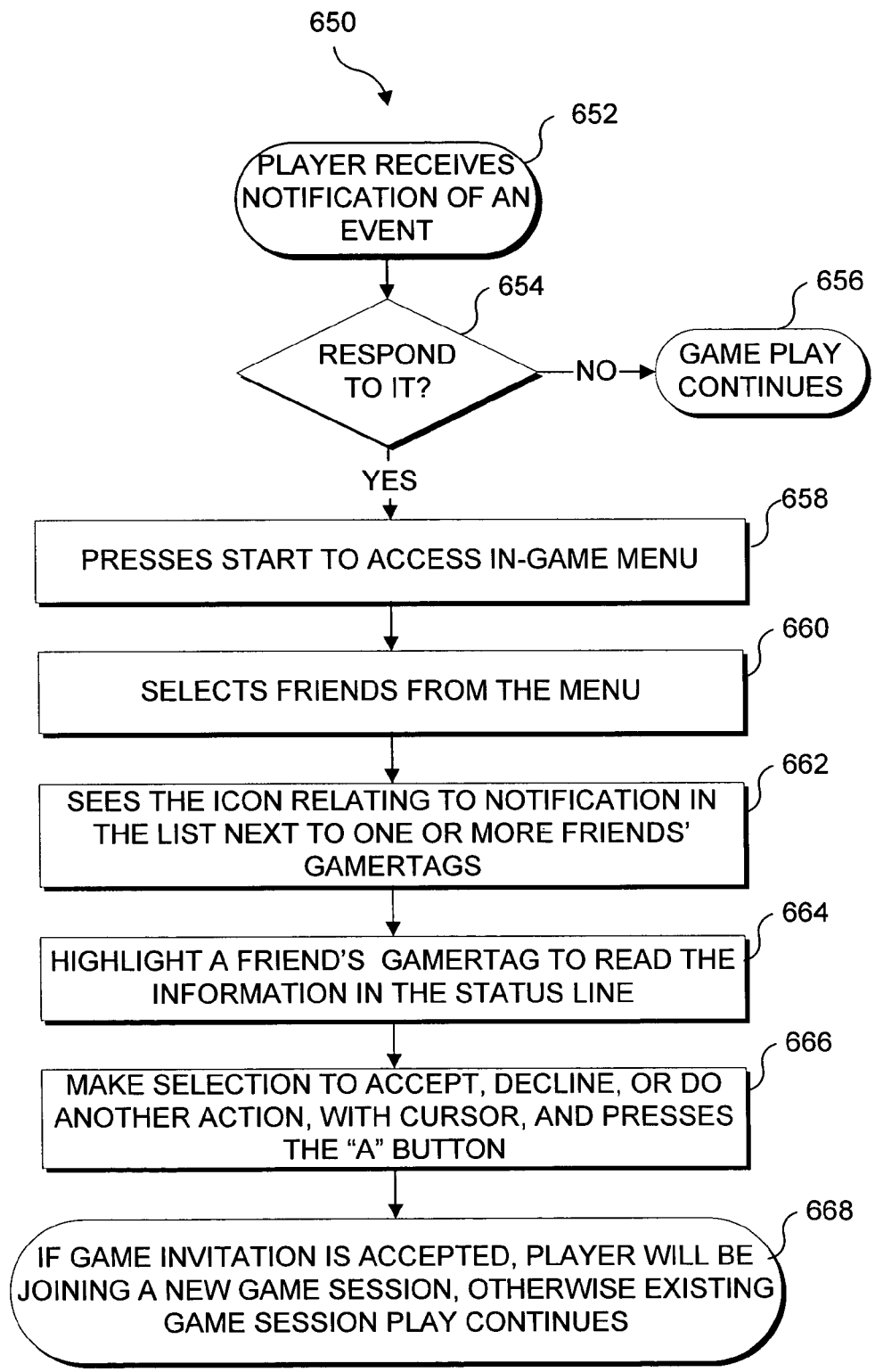
FIG. 13 is a flow chart showing the process a player uses to respond to notification.

FIG. 13 illustrates a flow chart 650 showing the step carried out in handling notifications sent to a player. The process begins at a step 652 wherein the player receives a notification written to the player's queues 450 by gaming service notifications module 406. A decision step 654 determines whether the player is responding to the notification of the game invitation. If the player ignores the notification, a step 656 indicates that the current game session play continues, which concludes the logic shown in this Figure. However, if the player responds to the notification in a step 658, the player presses the "Start" button on the handheld game controller to access the in-game menu. In a step 660, the user then selects the Friends option from the menu. From the resulting friends menu, the user sees a presence icon in the list next to one or more friends, in a step 662. The presence icon indicates the type of notification that was received, e.g., the presence icon on line 722f of FIG. 12 when appearing next to the Gamertag of a friend, indicates that a request to join in playing a game has been received from that friend. In a step 664, the player highlights the friend that initiated the notification and can read the description in the status line for more detailed information regarding the type of notification and related details. A step 666 indicates that the player can use the cursor control on the handheld controller to select one of three options and then press the "A" button on the controller to accept the selection. The options for responding to the notification are to accept, decline, or do another action.

The type of notification received by the player determines the end of the process. If the player has accepted an invitation to join a friend in playing a game for a title already loaded by the player in the game console, the player will be joined in playing a game session with the user. Otherwise, for other types of notifications or if the player does not accept a request, game play continues in a step 668. For example, if the notification is an add friend request, the user will return to playing the current game session after responding to the request. If the notification was a game invitation to play a different game than is currently loaded, the user will be asked to perform other steps to initiate play in the different game, as already described above in connection with FIG. 5.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to load a game and to automatically join an online game with a friend selected from a friends list of the user, comprising the steps of:

(a) initiating a gaming session by logging a user on to an online gaming service;
(b) identifying an online game associated with the online gaming service to join that is currently being played by the friend, wherein the online game is different than an online game currently loaded for play by the user;
(c) causing data identifying the online game currently being played by the friend to be stored in a local non-volatile storage;
(d) prompting the user to load the online game currently being played by the friend;
(e) restarting the gaming session of the user with a newly loaded online game in response to user input; and
(f) automatically comparing the online game being played by the friend, as indicated by the data stored in the local non-volatile storage, with the newly loaded online game, and automatically joining the online game being played by the friend by bypassing at least some login requirements and without requiring any logon or password when it is determined:
  (i) the newly loaded online game is actually the same as the online game currently being played by the friend;
  (ii) the current online game being played by the friend has an opening for the user to join; and
  (iii) the online game of the friend has not yet concluded.

2. The method of claim 1, wherein identifying an online game comprises the user selecting the online game being played by the friend from a friend list of the user.

3. The method of claim 1, wherein the data stored in the local non-volatile storage are disregarded when the online game currently being played by the friend is loaded by the user, if more than a predefined interval of time has elapsed since the data identifying the online game and the online game session being played by the friend were stored in the local non-volatile storage.

4. The method of claim 1, wherein identifying an online game comprises accepting an invitation from the friend to play in the online game currently being played by the friend.

5. The method of claim 4, further comprising the step of displaying the invitation from the friend to the user.

6. The method of claim 2, further comprising the steps of:
(a) enabling the friend to host the online game and to determine parameters related to the play of the online game; and
(b) enabling the friend to selectively determine, as one of the parameters, that one or more openings for other players to play the online game will be filled by friends included in the friends list of the friend.

7. The method of claim 6, further comprising the step of enabling the friend to send a plurality of invitations to friends included in the friends list of the friend, to play the online game currently loaded by the friend.

8. The method of claim 4, further comprising the steps of:
(a) enabling the friend to host the online game and to determine parameters related to the play of the online game; and
(b) enabling the friend to only allow friends to join the online game being hosted by the friend.

9. The method of claim 4, further comprising the steps of:
(a) enabling the friend to host the online game and to determine parameters related to the play of the online game; and
(b) enabling the friend to only allow invited friends to join the online game being hosted by the friend.

10. The method of claim 1, further comprising the step of enabling the user to selectively add an online player to the friends list of the user by:

(a) sending a request to the online player to add the online player to the friends list of the user; and
(b) if the online player selectively accepts the request, automatically adding the online player to the friends list of the user, and automatically adding the user to the friends list of the online player.

11. The method of claim 10, further comprising the step of enabling the user to cancel the request for the online player to be added to the friends list of the user if the online player has not yet accepted the request.

12. The method of claim 2, further comprising the step of enabling the friend to set a plurality of options that control an interaction between the user selected in the friends list and the friend during play of online games.

13. The method of claim 1, further comprising the step of displaying information related to online game play for each friend on the friends list.

14. A memory medium on which are stored machine readable instructions for the method of claim 1.

15. A system for enabling a user change an online game and joint an online game with a friend selected from a friends list of the user, comprising:
(a) a gaming service that couples players in communication to play online games over a network; and
(b) a game playing device that includes:
  (i) a network interface for coupling the game playing device in communication with the gaming service and with other game playing devices;
  (ii) a memory for storing machine readable instructions;
  (iii) a user input control;
  (iv) a display interface that is adapted to couple to a display; and
  (v) a processor that is connected to the network interface, the memory, the user input control, and the display interface, said processor executing the machine instructions stored in memory to carry out a plurality of functions, including:
  logging on to an online gaming service;
  identifying an online game associated with the online gaming service to join that is currently being played by the friend, wherein the online game is different than the online game currently loaded for play by the user;
  causing data identifying the online game currently being played by the friend to be stored in a local non-volatile storage;
  prompting the user to load the online game currently being played by the friend; and
  restarting the gaming session of the user with a newly loaded online game in response to user input; and
  automatically comparing the online game being played by the friend, as indicated by the data stored in the local non-volatile storage, with the newly loaded online game, and automatically joining the online game being played by the friend by bypassing at least some login requirements and without requiring any logon or password when it is determined:
    (i) the newly loaded online game is actually the same as the online game currently being played by the friend;
    (ii) the current online game being played by the friend has an opening for the user to join; and
    (iii) the online game of the friend has not yet concluded.

16. The system of claim 15, wherein identifying an online game comprises the user accepting an invitation from the friend to join in playing the online game being played by the friend.

17. The system of claim 15, wherein the data stored in the memory of the game playing device of the user are disregarded when the online game currently being played by the friend is loaded in the game playing device by the user, if more than a predefined interval of time has elapsed since the data identifying the online game and the online game session being played by the friend were stored in said memory.

18. The system of claim 16, wherein the invitation received from the friend is displayed to the user.

19. The system of claim 16, wherein the gaming service automatically cancels the invitation sent to the user after a predefined period of time has elapsed without the user accepting the invitation to play in the online game currently loaded for play by the friend.

20. The system of claim 16, wherein the machine instructions further cause the processor to enable the friend to set a plurality of options that control an interaction between the friend selected in the friends list and the user, during play of online games.

21. The system of claim 16, wherein the machine instructions further cause the processor to display information related to online game play for each friend on the friends list of the user.

* * * * *